Patented Dec. 22, 1936

2,065,331

UNITED STATES PATENT OFFICE 2,065,331

METHOD OF PREPARING MIXED ESTERS

Roy H. Kienle, Schenectady, N. Y., assignor to General Electric Company, a corporation of New York No Drawing. Application June 21, 1929, Serial No. 372,808. Renewed June 6, 1936

17 Claims. (Cl. 260—8)

This invention relates to an improved method of preparing mixed esters of the alkyd resin type.

It is known that vegetable oils and resins of the alkyd type do not blend directly in all proportions. It is also known that valuable products result when mixed esters of glycerine, phthalic anhydride and oxidizable fatty acids are made. For example, such products find use in air drying paints or lacquers, or in insulation varnishes such as are used for wire enamel or oil proof coil impregnation varnish.

In a copending application of Edward S. Dawson, Jr., entitled "Process of making resinous compositions", Serial 169,146, filed Feb. 17, 1927, now Patent No. 1,888,849, assigned to the same assignee as the present application, there is disclosed a method of preparing mixed esters of the type with which this application is concerned. There is disclosed in that application a method for preparing such mixed esters by dissolving a suitable amount of drying oil in phthalic anhydride and after causing the two substances to completely combine, glycerine is added and the esterification is completed.

In accordance with my invention the glycerine is added to the oil first and completely combined therewith, after which the phthalic anhydride is added and the esterification is completed to form a resinous product. The advantage of carrying out the process by this method is that practically no phthalic anhydride is lost during the reaction, no refluxing is necessary, and the resin ingredients may be combined with the oil directly and practically in all proportions to yield mixed esters.

Also in carrying out my invention I may employ oils having drying properties, that is drying or semi-drying oils or mixtures thereof, mono- or polyvalent alcohols or mixtures thereof, or mono or polybasic acids or mixtures thereof.

By the method of my invention I obtain a homogeneous blend of mixed esters which apparently is a complex compound of the ingredients regardless of the percent of oil used. What probably happens, is that a partial breaking down of the oil occurs during preheating and the products thus formed unite with the first ingredient of the alkyd resin added which subsequently carries the remaining ingredients into a homogeneous union forming mixed esters.

As examples of my invention, I cite the following which are to be understood as being representative examples merely by way of illustration and the proportions used therein are not to be understood as limiting proportions, for obviously, they may be varied.

*Example 1.*—40 Parts by weight of linseed oil were heated to 280° to 300° C. (The heating may be continued at this temperature to yield any desired body in the oil though this is not necessary in carrying out the process of the invention.) Then 20 parts by weight of glycerine were added, whence the mixture became turbid, considered evidence of immiscibility. By continuing the heating around 250°–260° C. however, the entire mixture shortly cleared. 49 parts by weight of phthalic anhydride were then slowly added, the temperature being held between 200° and 235° C., and the entire melt being brought to the desired end point. As the phthalic anhydride was added considerable evidence of reaction was observed and the whole melt, although slightly opaque at first rapidly became clear and transparent, indicating that complete reaction had occurred.

The above example is based upon the preparation of a blend corresponding to—

| | Percent by weight |
|---|---|
| Linseed glyceride | 40 |
| Phthalic glyceride | 60 |

As further examples of my invention illustrating the use of alcohols other than glycerine, acids other than phthalic, and oils other than linseed, the following are given. Each of the following formulae has been tested and found to be satisfactory. The procedure used is as given in Example 1 and therefore need not be repeated. Only the actual formulae are therefore given.

*Example 2*

| | Parts by weight |
|---|---|
| Phthalic anhydride | 243 |
| Glycerine | 100 |
| China-wood oil | 400 |

In this case the glycerine must be added slowly to the oil or the oil will gel before the glycerine has completely combined therewith.

*Example 3*

| | Parts by weight |
|---|---|
| Phthalic anhydride | 191 |
| Rosin (abietic acid) | 120 |
| Glycerine | 85 |
| China-wood oil | 390 |

This example illustrates the use of a mixture of a monobasic and a polybasic acid.

*Example 4*

| | Parts by weight |
|---|---|
| Cottonseed oil | 90 |
| China-wood oil | 350 |
| Rosin | 95 |
| Phthalic anhydride | 195 |
| Glycerine | 92 |
| Diethylene glycol | 17 |

In this case a mixture of alcohols is added to a mixture of oils. This example illustrates the use of a mixture of oils, acids and alcohols to form the mixed esters.

Example 5

| | Parts by weight |
|---|---|
| Phthalic anhydride | 220 |
| Fatty acid (linseed) | 92 |
| Linseed oil | 300 |
| Glycerine | 92 |

In this example the glycerine is first added to the linseed oil after which at the proper time the mixture of acids is added. In this case a mixture of acids and a single alcohol and single oil were used.

Example 6

| | Parts by weight |
|---|---|
| Phthalic anhydride | 220 |
| Fatty acid, (linseed) | 92 |
| Linseed oil | 300 |
| Glycerine | 72 |
| Glycol | 20 |

In this case the ingredients are the same as in Example 5 but a portion of the glycerine is replaced by glycol. The procedure is as in Example 5.

What I claim as new and desire to secure by Letters Patent of the United States is:

1. The process which comprises adding to a preheated drying oil first a polyhydric alcohol, forming a combination of the two, and thereupon adding to the combination a polybasic organic acid and esterifying the mass.

2. The process which comprises preheating an oil having drying properties, heating therewith a polyhydric alcohol at about 250° to 260° C. until a clear mass is produced and reacting with said mass a polybasic organic acid at 200° to 235° C. until esterification is complete and a resinous product is formed.

3. The process which comprises combining a mixture of polyhydric alcohols with an oil having drying properties, adding a polybasis organic acid to the combination and esterfying the entire mass.

4. The process which comprises combining a polyhydric alcohol with an oil having drying properties, adding a mixture comprising polybasic organic acid and monobasic organic acid to the combination and esterifying the entire mass.

5. The process which comprises combining a polyhydric alcohol with a drying oil, adding a mixture comprising polybasic organic acid and monobasic organic acid to the combination and esterfying the entire mass.

6. The process which comprises combining a polyhydric alcohol with a mixture comprising drying and semi-drying oils, adding a polybasic organic acid to the combination and esterifying the entire mass.

7. The process which comprises combining a polyhydric alcohol with a mixture comprising drying and semi-drying oils, adding a mixture comprising polybasic organic acid and monobasic organic acid to the combination and esterifying the entire mass.

8. The process which comprises combining a mixture of polyhydric alcohols with a mixture comprising drying and semi-drying oils, adding a mixture comprising polybasic organic acid and monobasic organic acid to the combination and esterifying the entire mass.

9. The process which comprises heating an oil having drying properties, adding thereto a polyhydric alcohol, heating until there is a complete combination of the oil and alcohol and finally adding a polybasic organic acid and heating until complete reaction has occurred and a resinous product is formed.

10. The process which comprises heating a drying oil, adding glycerine thereto, heating the mixture until the glycerine and oil have completely combined, then adding phthalic anhydride to the combination and heating to complete esterification.

11. The process which comprises heating linseed oil to 280° to 300° C., adding glycerine thereto, heating the mixture at 250° to 260° C. until the glycerine and oil have completely combined, adding phthalic anhydride to the combination and heating between 200° and 235° C. until a resinous product is formed.

12. The process which comprises combining a mixture of polyhydric alcohols with a preheated oil having drying properties, adding a polybasic organic acid to the combination and esterifying the entire mass.

13. The process which comprises combining a polyhydric alcohol with a preheated oil having drying properties, adding a mixture comprising polybasic organic acid and monobasic organic acid to the combination and esterifying the entire mass.

14. The process which comprises combining a polyhydric alcohol with a preheated drying oil, adding a mixture comprising polybasic organic acid and monobasic organic acid to the combination and esterifying the entire mass.

15. The process which comprises combining a polyhydric alcohol with a mixture comprising preheated drying and semi-drying oils, adding a polybasic organic acid to the combination and esterifying the entire mass.

16. The process which comprises combining a polyhydric alcohol with a mixture comprising preheated drying and semi-drying oils, adding a mixture comprising polybasic organic acid and monobasic organic acid to the combination and esterifying the entire mass.

17. The process which comprises combining a mixture of polyhydric alcohols with a mixture comprising preheated drying and semi-drying oils, adding a mixture comprising polybasic organic acid and monobasic organic acid to the combination and esterifying the entire mass.

ROY H. KIENLE.

DISCLAIMER 2,065,331.—*Roy H. Kienle*, Schenectady, N. Y. METHOD OF PREPARING MIXED ESTERS. Patent dated December 22, 1936. Disclaimer filed August 10, 1937, by the assignee, *General Electric Company*.

Hereby disclaims claims 3, 4, 5, 7, and 8 of said patent.

[*Official Gazette August 31, 1937.*]

mixture of oils. This example illustrates the use of a mixture of oils, acids and alcohols to form the mixed esters.

Example 5

| | Parts by weight |
|---|---|
| Phthalic anhydride | 220 |
| Fatty acid (linseed) | 92 |
| Linseed oil | 300 |
| Glycerine | 92 |

In this example the glycerine is first added to the linseed oil after which at the proper time the mixture of acids is added. In this case a mixture of acids and a single alcohol and single oil were used.

Example 6

| | Parts by weight |
|---|---|
| Phthalic anhydride | 220 |
| Fatty acid, (linseed) | 92 |
| Linseed oil | 300 |
| Glycerine | 72 |
| Glycol | 20 |

In this case the ingredients are the same as in Example 5 but a portion of the glycerine is replaced by glycol. The procedure is as in Example 5.

What I claim as new and desire to secure by Letters Patent of the United States is:

1. The process which comprises adding to a preheated drying oil first a polyhydric alcohol, forming a combination of the two, and thereupon adding to the combination a polybasic organic acid and esterifying the mass.

2. The process which comprises preheating an oil having drying properties, heating therewith a polyhydric alcohol at about 250° to 260° C. until a clear mass is produced and reacting with said mass a polybasic organic acid at 200° to 235° C. until esterification is complete and a resinous product is formed.

3. The process which comprises combining a mixture of polyhydric alcohols with an oil having drying properties, adding a polybasis organic acid to the combination and esterfying the entire mass.

4. The process which comprises combining a polyhydric alcohol with an oil having drying properties, adding a mixture comprising polybasic organic acid and monobasic organic acid to the combination and esterifying the entire mass.

5. The process which comprises combining a polyhydric alcohol with a drying oil, adding a mixture comprising polybasic organic acid and monobasic organic acid to the combination and esterfying the entire mass.

6. The process which comprises combining a polyhydric alcohol with a mixture comprising drying and semi-drying oils, adding a polybasic organic acid to the combination and esterifying the entire mass.

7. The process which comprises combining a polyhydric alcohol with a mixture comprising drying and semi-drying oils, adding a mixture comprising polybasic organic acid and monobasic organic acid to the combination and esterifying the entire mass.

8. The process which comprises combining a mixture of polyhydric alcohols with a mixture comprising drying and semi-drying oils, adding a mixture comprising polybasic organic acid and monobasic organic acid to the combination and esterifying the entire mass.

9. The process which comprises heating an oil having drying properties, adding thereto a polyhydric alcohol, heating until there is a complete combination of the oil and alcohol and finally adding a polybasic organic acid and heating until complete reaction has occurred and a resinous product is formed.

10. The process which comprises heating a drying oil, adding glycerine thereto, heating the mixture until the glycerine and oil have completely combined, then adding phthalic anhydride to the combination and heating to complete esterification.

11. The process which comprises heating linseed oil to 280° to 300° C., adding glycerine thereto, heating the mixture at 250° to 260° C. until the glycerine and oil have completely combined, adding phthalic anhydride to the combination and heating between 200° and 235° C. until a resinous product is formed.

12. The process which comprises combining a mixture of polyhydric alcohols with a preheated oil having drying properties, adding a polybasic organic acid to the combination and esterifying the entire mass.

13. The process which comprises combining a polyhydric alcohol with a preheated oil having drying properties, adding a mixture comprising polybasic organic acid and monobasic organic acid to the combination and esterifying the entire mass.

14. The process which comprises combining a polyhydric alcohol with a preheated drying oil, adding a mixture comprising polybasic organic acid and monobasic organic acid to the combination and esterifying the entire mass.

15. The process which comprises combining a polyhydric alcohol with a mixture comprising preheated drying and semi-drying oils, adding a polybasic organic acid to the combination and esterifying the entire mass.

16. The process which comprises combining a polyhydric alcohol with a mixture comprising preheated drying and semi-drying oils, adding a mixture comprising polybasic organic acid and monobasic organic acid to the combination and esterifying the entire mass.

17. The process which comprises combining a mixture of polyhydric alcohols with a mixture comprising preheated drying and semi-drying oils, adding a mixture comprising polybasic organic acid and monobasic organic acid to the combination and esterifying the entire mass.

ROY H. KIENLE.

DISCLAIMER 2,065,331.—*Roy H. Kienle*, Schenectady, N. Y. METHOD OF PREPARING MIXED ESTERS. Patent dated December 22, 1936. Disclaimer filed August 10, 1937, by the assignee, *General Electric Company*.

Hereby disclaims claims 3, 4, 5, 7, and 8 of said patent.

[*Official Gazette August 31, 1937.*]

DISCLAIMER 2,065,331.—*Roy H. Kienle*, Schenectady, N. Y. METHOD OF PREPARING MIXED ESTERS. Patent dated December 22, 1936. Disclaimer filed August 10, 1937, by the assignee, *General Electric Company*.

Hereby disclaims claims 3, 4, 5, 7, and 8 of said patent.

[*Official Gazette August 31, 1937.*]